Patented May 9, 1939

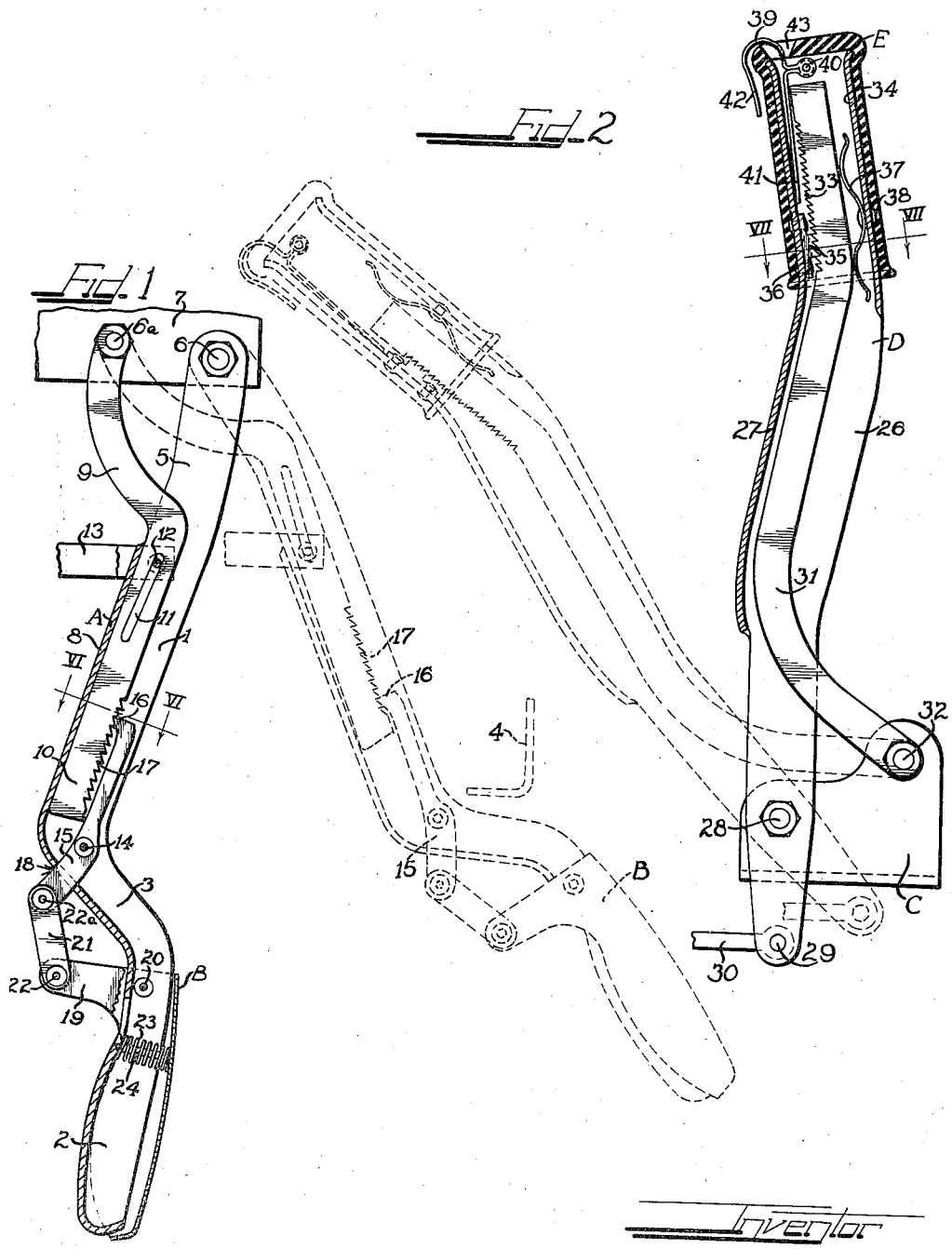

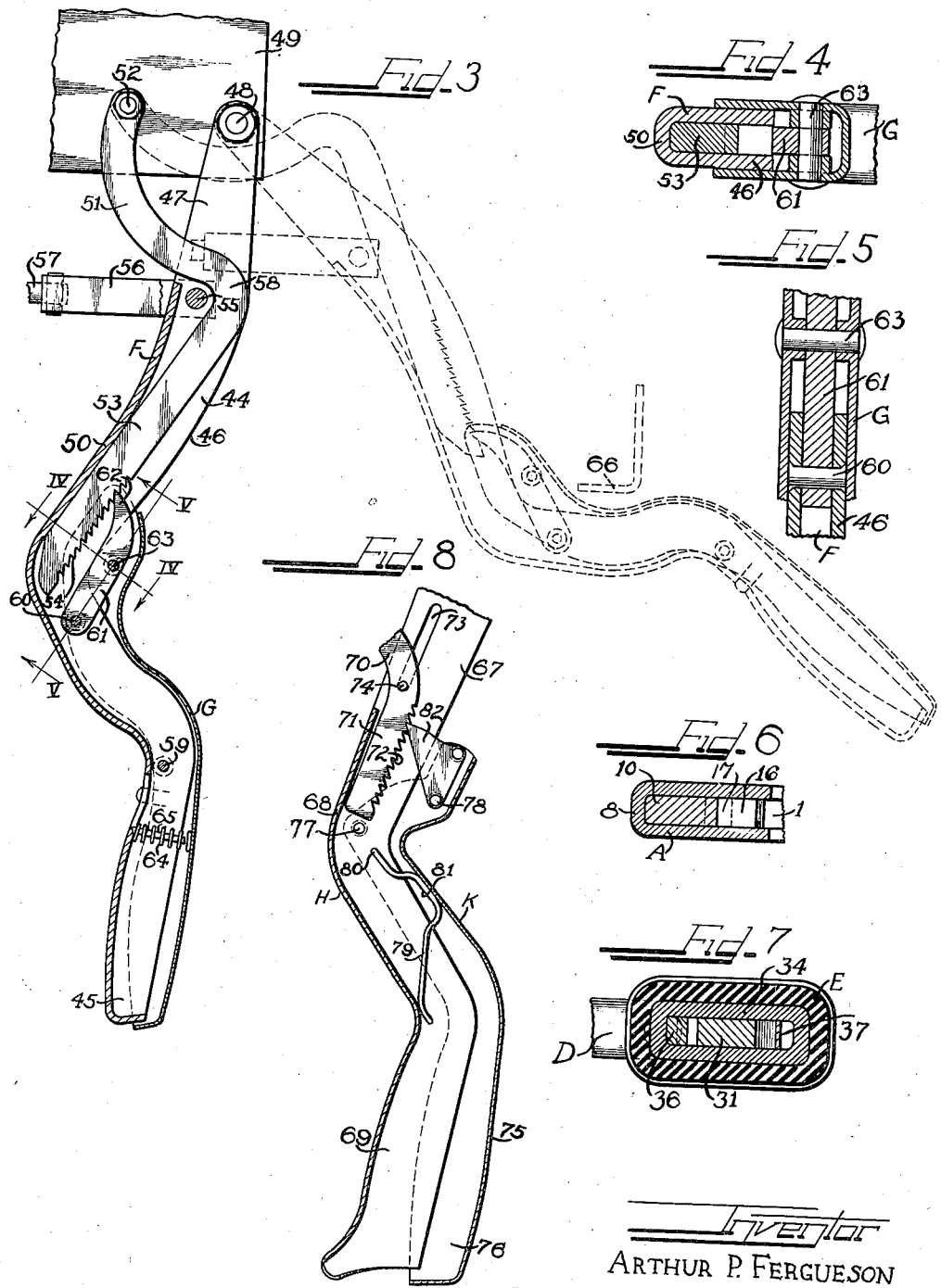

2,157,850

UNITED STATES PATENT OFFICE 2,157,850

HAND BRAKE LEVER

Arthur P. Fergueson, Detroit, Mich., assignor, by mesne assignments, to Houdaille-Hershey Corporation, Detroit, Mich., a corporation of Michigan Application November 12, 1936, Serial No. 110,441

21 Claims. (Cl. 74—537)

The present invention relates to a hand brake lever and more particularly to a hand brake lever construction useful with automotive vehicles.

An object of the present invention is to provide an improved hand brake lever of the dash type.

Another object of the present invention is to provide an improved brake lever of the ratchet type utilizing a movable rack bar which is pivoted eccentrically with respect to the lever pivot and which has its rack portion slidably borne by the brake lever, and detent means carried by the brake lever for cooperating with the rack to latch the brake lever in set position.

A further object of the present invention is to provide an improved brake lever construction of the ratchet type wherein one of the cooperating latching members is carried by a bar slidably borne by the brake lever and which bar is pivoted eccentrically with respect to the brake lever pivot to cause differential movement of the brake lever and bar to accelerate braking action, and the other of the cooperating latching members is carried by the brake lever.

A further object of the present invention is to provide a brake lever with trough-like body and handle portions, a trough-like actuating member pivoted to the brake lever to telescopically close the handle portions, and cooperating rack and detent means engageable within the lever body to latch the lever in set positon, the actuating member being adapted to establish and dis-establish latching engagement.

A still further object of the present invention is to provide a brake lever construction of the ratchet type wherein latching engagement is effected within the confines of the lever.

The above, other, and further objects of the present invention will be apparent from the following description and accompanying drawings.

The accompanying drawings illustrate various embodiments of the present invention, and the views thereof are as follows:

Figure 1 is a view, partially in side elevation and partially in section, of a brake lever constructed in accordance with the principles of the present invention, and arranged as a dash-type of lever, showing in full lines position of the parts when the lever is in off or released position, and in dotted lines the position of the lever when it is set to apply the brakes of the vehicle.

Figure 2 is a view, partially in side elevation and partially in section, of a brake lever constructed in accordance with the principles of the present invention, showing it mounted as a brake lever of the conventional type, that is when pivoted adjacent the transmission casing of an automotive vehicle, with the handle projecting upwardly, showing in full lines the relationship of the parts when the lever is in off or released position, and in dotted lines the lever in set position with the brakes applied.

Figure 3 is a view, partially in elevation and partially in section, of a brake lever construction in accordance with the principles of the present invention as applied to a dash type of lever, showing a modified construction, the full lines illustrating the parts in off or released position, and the dotted lines illustrating the lever in set or applied position.

Figure 4 is an enlarged transverse sectional view taken substantially in the plane of line IV—IV of Figure 3.

Figure 5 is a fragmental sectional view taken substantially in the plane indicated by line V—V of Figure 3.

Figure 6 is a transverse sectional view taken substantially in the plane indicated by line VI—VI of Figure 1.

Figure 7 is an enlarged transverse sectional view taken substantially in the plane indicated by line VII—VII of Figure 2, and Figure 8 is a fragmental view, partially in elevation and partially in section, of a further modification of a lever constructed in accordance with the principles of the present invention.

The drawings will now be explained.

The form of brake lever illustrated in Figure 1 comprises a brake lever A suitably fashioned from metal stock to provide a trough-like body portion 1, and a trough-like handle portion 2, the length of the handle portion 2 being offset with respect to the body portion 1, by a trough-like neck 3 to provide proper clearance when the lever is moved to its limit of movement in brake applying direction, to escape the lower margin of the cowl or instrument board, represented fragmentally at 4.

The side walls of the body of the lever A are extended forming parallel legs 5, the extremities of which legs 5 are apertured to receive a pivot bolt or pin 6 to pivotally attach the lever to a suitable bracket, represented at 7, as a conventional form of bracket, which bracket is usually secured to the dashboard, between the dashboard and the instrument board 4.

In the formation of the lever A, the web 8 thereof is comparatively narrow with reference to the depth of the side walls forming the trough shaped body 1, as may be readily observed in Figure 6.

A hand lever latch bar, or rack bar 9, is pivoted at 6a to the bracket 7, in offset relationship or eccentric relationship, to the pivot 6 of the brake lever A. The bar 9 is so fashioned as to have a rack portion 10 slidably borne within the trough-like body 1 of the lever A. A part of the portion 10 of the bar 9 bears against the web 8 of the lever body, while its side surfaces are guided by the side walls of the body. Between the rack end 10 of the bar 9 and its pivot, the bar is slotted at 11 to receive a pin 12 which passes through apertures in the walls of the trough-like body 1, and to which is pivotally connected a yoke 13, to which is suitably connected a cable, rod, or other connector, between the lever A and the brake mechanism of the vehicle. The slot 11 in the bar 9 is of sufficient length to permit endwise movement of the bar 9 with respect to the lever A as the lever is swung about its pivot 6 in service.

The offset or eccentric relationship of the pivots 6 and 6a of the lever A and bar 9, respectively, causes differential movement of the lever and bar as the lever is swung about its pivot 6.

It will thus be observed that that portion of the bar 9 which lies within the trough-like body 1 of the lever A is guided within the trough-like body and is slidingly borne by the lever.

Rockingly mounted on a pivot 14 is a dog or detent member 15 having an end 16 shaped to enter any of the notches of the rack teeth 17 of the rack bar 9. The opposite end of the detent 15 projects through a slot 18 in the web portion of the neck 3 of the lever.

An actuating member B, fashioned in the present instance from flat metal to provide a trough-like handle portion and formed with spaced parallel legs 19, is pivoted at 20 to side walls of the trough-like portion of the handle 2 in such position as to close the opening in the trough-like handle portion 2, with the legs 19 extending beyond the pivot 20, as is illustrated in Figure 1. Connecting the extremities of the legs 19 and the projecting end of the detent 15 is a link 21, pivotally connected to the legs and detent at 22 and 22a respectively.

In order to hold the end 16 of the detent 15 in engagement with a notch of the rack 10, a spring 23 is interposed between the web of the trough-like portion of the handle 2 and the inner surface of the web of the actuating member B, as may be observed in Figure 1. To prevent dislodgment of the spring, a pin 24 is secured to the web of the handle portion 2. The spring 23 surrounds the pin 24 and is thereby held in operative position. The length of the pin 24 is such as to form a stop for the actuating member B when the same is squeezed to disengage the point 16 of the detent 15 from the rack 10 of the bar 9.

In operation of the lever illustrated in Figure 1 to apply the brakes, the lever is grasped and swung in counterclockwise direction about its pivot. Such swinging movement of the lever will cause relative movement between the rack bar 9 and the lever, thus drawing the rack 10 underneath the end 16 of the detent or latch dog 15 until the lever has been moved to set position. During such movement, as before stated, the rack 10 will travel underneath the pointed end 16 of the detent so that the pointed end 16 may engage any of the notches of the rack at the time the lever is moved to set position. The dotted line position of Figure 1 shows the lever in set position with the pointed end 16 of the detent engaging the next to last notch of the rack 10. This dotted line position of the lever shows the relationship of the lever to the lower margin of the instrument board 4 when the lever is in set or applied position.

It will be readily observed that when the lever A is in released or off position, it is behind the instrument board and thus out of the way of the person or persons occupying the front seat of an automotive vehicle.

The brake lever, illustrated in Figure 2, is of the conventional type, that is to say, the type pivoted to a bracket C which may be attached to or adjacent the transmission casing of an automotive vehicle, with the lever extending upwardly through the floor of the vehicle.

The lever D, illustrated in Figure 2, is of the same general type as described with reference to Figure 1, in that it is formed with a trough-like body having side walls 26 and a web 27. Preferably, the handle portion of the lever is closed by any suitable forming operation, as may be observed in Figure 2. The lever D is pivoted at 28 to the bracket C and has its lower end extending below the pivot where at 29 it is pivotally connected to a brake rod 30.

A hand lever latch bar or rack bar 31 is pivoted at 32 to the bracket C in offset or eccentric relationship with respect to the pivot 28 of the lever D. The rack bar 31 has a part lying within and guided by the body of the lever D, as may be observed in Figure 2. In this form of lever, the rack bar 31 is extended so that its rack portion 33 is within the handle portion 34 of the lever. For cooperating with the rack 33 of the bar 31, a detent or latch dog 35 is riveted, as at 36, interiorly of the handle portion 34 in position to engage notches of the rack 33. The detent or latch dog is illustrated as having several teeth for cooperating with the rack. It may be understood, however, that a latch dog or detent having one tooth or more than the number illustrated might be employed if desirable.

For maintaining the rack in engagement with the detent or latch dog 36, a spring 37 is secured, as by means of a rivet 38, within the handle portion 34 of the lever and bears against the end portion of the rack bar 31 in such manner as to urge the rack portion into latching engagement with the latch dog or detent 36.

For disengaging the rack from the detent 36, a latch release 39 is provided. The latch release 39 is illustrated as formed from flat metal having a portion bent around a pivot 40 and with one end 41 extending between the rack 33 of the bar 31 and the adjacent inner surface of the handle portion 34 of the lever. Another part 42 of the latch release extends upwardly, outwardly, and downwardly in such position as to be conveniently contacted by a thumb of the operator of the vehicle to disengage the rack 33 from latching engagement with the detent 36, when occasions arise.

It will be observed that as the upper end of the lever D is swung to the left from released or off position, shown in full lines, to applied or set position, shown in dotted lines, the rack 33 will be drawn along the detent 36 until such time as the pull on the lever is released whereupon spring 37 becomes effective to cause latching engagement of the rack 33 with the detent 36, thus latching the lever in set position. When it is desired to release the lever from set position, it is given a slight pull to the left, the latch release 39 actuated to swing the rack out of engagement with the detent 36, whereupon the lever may be returned to its release or off position, which is the full line position of Figure 2.

During movement of the lever from the set position, dotted line position of Figure 2, to the off position, the full line position, the rack end of the bar 31 will move towards the free end of the lever D, and when the lever reaches its extent of movement in the release direction, the spring 37 causes engagement of the rack 33 with the detent 36 to latch the lever in this position.

In order to afford a smooth hand grip for the upper end of the lever D, a closure member E may be provided. This closure member may be made of rubber or rubber composition and stretched over the free end of the lever, or may be made of thin sheet metal suitably formed and spun about the free end of the lever. In the event that the closure E is of metal, then in its formation, an aperture 43 will be provided in its end to receive the portion 42 of the latch release 39, prior to the time that this end is bent over into the position shown in Figure 2.

In like manner, if the closure member E be of rubber or rubber composition, a like aperture 43 would be provided and the portion 42 of the latch release 39 would remain unbent, until the closure was applied, then it would be bent over as illustrated.

The lever F of Figure 3 is fashioned from flat sheet metal formed to provide a trough-like body 44 and a trough-like handle 45, with the side walls 46 defining the trough-like body 44 continued to provide legs 47 for pivoting the lever F at 48 to a suitable bracket, illustrated conventionally at 49. In the formation of the lever F of this modification, a web 50 is fashioned.

A rack bar 51 is pivoted at 52 to the bracket 49, in offset or eccentric relationship with respect to the pivot 48 of the lever F, and has a part 53 lying within and guided by the trough-like body 44 of the lever. The extremity of the portion 53 is provided with notches forming a rack 54.

A pivot pin 55 passing through suitable apertures in the legs 47 connects a yoke 56 to the lever for connection thereto of a cable or rod 57 which in turn is suitably fastened to the brake operating mechanism of the vehicle. In order to pass about the pivot 55, the bar 51 is sharply bent as at 58 to afford suitable clearance.

An actuating member G, trough-like in section, is pivoted at 59 to the walls 46 of the lever, adjacent the trough-like handle portion 45 thereof, and in length is contoured to follow generally the gooseneck effect of the shape of the lever, as illustrated in Figure 3. The actuating member G, therefore, closes the open trough-like handle portion 45.

Pivoted at 60 to the walls 46 of the lever, is a latch dog or detent 61 having a pointed end 62 shaped to engage a notch of the rack 54. For moving the end 62 out of engagement with the rack, the detent is pivoted at 63 to the actuating member G, as illustrated in Figure 3.

In order to hold the end 62 of the detent in latching engagement with the rack, a spring 64 is interposed between the web of the trough-like handle portion 45 and the web of the actuating member G, and is guided by a pin 65 which is shown as secured in place on the web of the handle. The length of the pin is such as to permit squeezing of the actuating member G, towards the handle portion, for lifting the end 62 of the detent out of latching engagement with the rack 54. Normally the spring 64 is effective to maintain the detent in latching engagement with the rack.

In operating the lever shown in Figure 3, the operator grasps the handle portion and swings it in counterclockwise direction, as viewed in Figure 3, which swinging movement causes the rack 54 to be drawn underneath the end 62 of the detent 61 until such time as the pulling pressure is released, whereupon action of the spring 64 will cause latching engagement of the detent with the rack, such for instance as illustrated in the dotted line position of the lever.

As before stated, the lever F is given a gooseneck bend in its length, for the purpose of escaping contact with the margin of cowl or instrument board, shown fragmentally at 66. When the lever is in applied position, the handle portion thereof projects outwardly and downwardly from the instrument board, as shown in dotted lines. To release the lever, the actuating member is squeezed against the handle portion of the lever, whereupon the detent 61 is disengaged from the rack, and the lever returned to off or released position, which is the full line position of Figure 3.

The lever H, illustrated in Figure 8, is fashioned from flat sheet metal into substantially trough-like cross sectional shape, having side walls 67 and a web 68, with a trough-like handle portion 69.

A rack bar 70 has a portion 71 lying within and guided by the lever H, which portion is provided on one margin thereof with notches forming a rack 72. For guiding the rack end of the bar 70 in straight line direction, the walls 67 of the lever are slotted at 73 to receive a guide pin 74 secured in the bar 70 and extending through the slots. Engagement of the pin 74 with the slots 73, and the bearing of the rear or inner portion of the part 71 against the web 68 of the lever guides the rack end of the bar toward backward direction with respect to the detent.

An actuating member K, comprising a trough-shaped portion having a web 75 and side walls 76 is pivoted at 77, to the walls 67 of the lever, in position to close the trough-like handle portion 69 of the lever. The over all contour of the actuating member K follows in general the contour of the gooseneck end of the lever, so that when the lever is moved to set position, it will escape contact with the lower margin of an instrument board, as heretofore described, with reference to the other forms of levers herein mentioned.

The actuating member K is continued to overlie the rack 72 of the bar 70 and a detent member 82 is secured by means of rivets or the like 78 in position to engage a notch of the rack 72, as the lever is swung or pivoted in service.

To normally maintain the detent in engagement with the rack, a spring 79 is secured in place by bending its ends and passing the ends through suitable apertures in a wall of the lever, as at 80, which spring is provided with a central portion 81 in contact with the actuating member K. It is to be understood that, of course, some other form of spring might be interposed to accomplish the same purpose.

The operation of the brake lever illustrated in Figure 8 is substantially the same as the levers of the other forms heretofore described. To move the lever to brake applying or set position, it is swung in counterclockwise direction, as observed in Figure 8, which movement draws the rack underneath the nose of the pawl 82 until such position is reached whereupon the pawl enters a notch of the rack in that position to latch the lever in set position. To release, the actuating member is squeezed thereupon raising the nose of the pawl 82 from engagement with the rack, and the lever swung in the opposite direction.

Levers constructed in accordance with the present invention may be economically manufactured and assembled.

The principle involved in the present invention is a new one involving the swinging of the hand brake lever about one pivot and the swinging of the hand lever latch or rack bar about another pivot in such manner as to cause relative sliding movement between the brake lever and the rack bar, to accelerate latching action, with the cooperating latching members effective within the confines of the brake lever.

The invention has been described herein more or less precisely as to details, yet it is to be understood that the invention is not to be limited thereby, as changes may be made in the arrangement and proportion of the parts, and equivalents may be substituted, without departing from the spirit and scope of the invention.

The invention is claimed as follows:

1. Brake lever construction including a pivoted brake lever having trough-like body and handle portions, a bar slidably borne by said lever and having a rack portion within and extending lengthwise of the trough-like body of the lever, a trough-like actuating member pivoted to said lever and closing the trough-like handle portion of the lever, and a detent operatively connected with said actuating member and movable into and out of latching engagement with said rack by rocking movement of said member.

2. Brake lever construction including a pivoted brake lever having trough-like body and handle portions, a bar slidably borne by said lever and having a rack portion within and extending lengthwise of the trough-like body of the lever, a detent pivoted to said brake lever in position to engage said rack, a trough-like actuating member pivoted to said lever and closing the trough-like handle portion of the lever, and link connection between said actuating member and said detent.

3. Brake lever construction including a pivoted brake lever having trough-like body and handle portions, a bar slidably borne by said lever and having a rack portion within and extending lengthwise of the trough-like body of the lever, a trough-like actuating member pivoted to said lever and closing the trough-like handle portion of the lever, and a detent carried by said actuating member and movable into and out of latching engagement with said rack by rocking movement of said member.

4. In a device of the class described, in combination, a pivoted brake lever, a bar slidably borne by said lever and pivoted at a point remote from the lever pivot and having a rack portion extending lengthwise along the length of the lever, a detent carried by said lever and co-acting with said rack to latch the lever in set position, and means for disengaging said rack from said detent.

5. A brake lever construction including a brake lever pivoted to swing, a rack bar pivoted to swing with said lever and having a portion lying lengthwise along and always in contact with said lever, the pivots of said lever and bar being otherwise than coincidental, said bar having a rack as a part of the portion of the bar along said lever, a latch member engageable with said rack, spring means carried by said lever for normally maintaining said latch member and rack in engagement, and manually operable means carried by said lever and effective in opposition to said spring means to disengage the latch members and rack.

6. A brake lever construction including a brake lever pivoted to swing, a rack bar pivoted at one end laterally with respect to the lever pivot and having a part lying lengthwise along and always in contact with the lever, the construction being such that when the lever is swung about its pivot the said part of said bar will be caused to swing about its pivot and move endwise along said lever with to and fro movement, a latch member engageable with said rack, spring means carried by said lever for normally maintaining said latch member and rack in engagement, and manually operable means carried by said lever effective in opposition to said spring means to disengage the latch means and rack.

7. A brake lever construction including a brake lever pivoted to swing, a rack bar pivoted to swing with said lever and having a portion lying lengthwise along and always in contact with said lever, said bar having a rack as a part of the portion of the bar along said lever, a latch member engageable with said rack, spring means carried by said lever for normally maintaining said latch member and rack in engagement, and said brake lever and bar being otherwise than coincidentally pivoted so as to cause differential movement of said brake lever and bar to accelerate relative movement of the rack and latch member with respect to each other as the brake lever is swung about its pivot.

8. A brake lever construction including a hollow brake lever pivoted to swing, a rack bar pivoted in spaced relation to the lever pivot and having an elongated portion lying wholly within said hollow lever and endwise movable with respect to said lever, said bar having a rack as a part of the portion of the bar within said hollow lever, a pivoted latch member engageable with said rack within said hollow lever, a latch release operatively connected to said latch member for disengaging said latch member from said rack, and spring means normally effective to maintain said latch member in engagement with said rack.

9. A brake lever construction including a hollow brake lever pivoted to swing, a rack bar pivoted in spaced relation to the lever pivot and having an elongated portion lying wholly within said hollow lever and movable therein with respect to said lever, said bar having a rack as a part of the portion of the bar within said lever, a pivoted latch member engageable with said rack within said hollow lever, a latch release pivoted to said lever and operatively connected to said latch member for disengaging said latch member from said rack, spring means normally effective to maintain said latch member in engagement with said rack, and linkage connecting said latch release and said latch member.

10. In a device of the class described, in combination, a pivoted brake lever, a bar pivoted at one end at a point remote from the lever pivot and having a substantial part of its other end portion lying against and extending along the length of the lever and endwise slidably movable with respect to the lever along the length of the same as the lever is swung, said portion being serrated constituting a ratchet, detent means carried by said lever coacting with said ratchet to latch said lever in adjusted position, spring means carried by said lever for normally maintaining said detent and ratchet in latched engagement, and means carried by said lever operable for effecting unlatching of the detent and ratchet.

11. Brake lever construction including a hollow lever pivoted to swing, a rack bar pivoted at one end and arranged with its rack portion wholly within the hollow lever and extending therein lengthwise of the lever, said lever and bar being pivoted in spaced relation to cause differential endwise movement of the rack portion of the bar along the length of the lever as the lever is swung, a detent latching with said rack within said hollow lever, spring means for normally maintaining said detent and rack in latched engagement, and means for establishing disengagement of the detent and rack.

12. In combination, a hollow lever, a detent having a ratchet engaging part working within said hollow lever, a ratchet bar endwise slidable within said hollow lever and having its ratchet portion wholly within said lever and movable lengthwise of the lever to cause movement thereof with respect to the detent, spring means for maintaining said detent and ratchet in latched engagement, and manually operable means for effecting unlatching of said detent and ratchet.

13. In combination, a lever pivoted to swing, a bar pivoted to swing and having an elongated rack portion lying along and in contact with a portion of said lever lengthwise of the same, a pawl pivoted to said lever for latching with said rack portion, the construction being such that as the lever is swung about its pivot the elongated rack portion moves endwise along the length of the lever to move the rack with respect to the pawl for latching the lever in adjusted position.

14. Brake lever construction including a lever having channel shaped shank portion, a bar having a part within and lying along said portion and bearing against the web of said shank portion, said bar part being provided with ratchet teeth, a pawl pivoted to said lever and having a point for latching engagement with said ratchet, a latch release member pivoted to said lever and operatively connected with said pawl, and spring means for normally maintaining said pawl in latched engagement with said ratchet.

15. In a brake lever construction, a lever comprising a stamping forming channel shaped shank and grip portions, a detent actuating member comprising a stamping forming a channel shaped grip portion pivoted to said lever with the walls of the grip portions in lapped relation, a bar having an elongated rack portion bottomed in the channel shank portion of the said shank portion, a detent pivoted to said lever and to said actuating member for latching engagement with said rack, and spring means for normally maintaining said detent in latched engagement with said ratchet.

16. In a brake lever construction, a lever comprising a stamping forming channel shaped shank and grip portions, a detent actuating member comprising a stamping forming a channel shaped grip portion pivoted to said lever with the walls of the grip portions in lapped relation, a bar having an elongated rack portion bottomed in the channel shank portion of the lever and extending lengthwise of the shank portion, a detent pivoted to said lever for latching engagement with said rack, connections between said detent and said detent actuating member for unlatching the detent from the rack, and spring means for normally maintaining said detent and rack in latched engagement.

17. In combination, a lever comprising a stamping forming a channel shaped shank portion and a hollow grip portion which is closed in cross section, detent means fixed within the hollow grip portion, a bar extending lengthwise of the shank and grip portion and having a rack formed on that part of the bar within the grip portion of the lever, spring means for effecting latching engagement of the detent and rack, and means for effecting unlatching of the detent and rack.

18. Brake lever construction comprising a stamping forming a hollow shank and a grip portion, a bar having an elongated rack portion lying wholly within and arranged for endwise relative sliding movement along said shank portion in direction of the length of the shank portion, a detent arranged for latching engagement with said rack to latch the lever in adjusted position, and actuating means for effecting unlatching of the detent and rack.

19. In a device of the class described, in combination, a pivoted brake lever, a bar slidably borne by said lever and pivoted at a point remote from the lever pivot and having a rack portion extending along the lever wholly in the direction of its length and in contact with said lever as the latter swings, a detent carried by said lever and coacting with said rack to latch the lever in said position, and means carried by said lever for effecting disengagement of the rack and detent.

20. A brake lever construction including a lever pivoted to swing, a rack bar pivoted in spaced relation to said brake lever pivot and having an elongated portion lying lengthwise along and always in contact with said lever and endwise movable with respect to the same, said bar having a rack as a part of the portion of the same along said lever, a latch member engageable with said rack, spring means carried by said lever and normally effective to maintain engagement of said latch member and rack, and means carried by said lever and effective in opposite to said spring means for disengaging the latch member and rack.

21. A brake lever construction of the ratchet and pawl type comprising a hollow brake lever member adapted to receive operative parts within its hollow interior, a rack or ratchet bar endwise slidable within the hollow lever, a pawl operative within said hollow lever member for cooperating with said rack to latch the lever in set position, spring means effective within the hollow lever member for maintaining engagement of the pawl and rack, and an actuating member movable with said lever member and operative to effect disengagement of the pawl and rack.

ARTHUR P. FERGUESON.